(12) United States Patent
El-Keyi et al.

(10) Patent No.: US 12,738,990 B2
(45) Date of Patent: Sep. 15, 2026

(54) DOWNLINK PRECODING SWITCHING BASED ON CHANNEL VARIATION ESTIMATES

(71) Applicant: Telefonaktiebolaget LM Ericsson (publ), Stockholm (SE)

(72) Inventors: Amr El-Keyi, Kanata (CA); Chandra Bontu, Nepean (CA); George Jöngren, Sundbyberg (SE); Mats Åhlander, Solna (SE); Krister Edström, Hjärup (SE); Xueying Hou, Lund (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 18/572,615

(22) PCT Filed: Jun. 21, 2021

(86) PCT No.: PCT/IB2021/055461

§ 371 (c)(1),
(2) Date: Dec. 20, 2023

(87) PCT Pub. No.: WO2022/269311

PCT Pub. Date: Dec. 29, 2022

(65) Prior Publication Data

US 2024/0291528 A1 Aug. 29, 2024

(51) Int. Cl.
*H04B 7/0456* (2017.01)
*H04B 7/06* (2006.01)

(52) U.S. Cl.
CPC ......... *H04B 7/0456* (2013.01); *H04B 7/0626* (2013.01)

(58) Field of Classification Search
CPC .. H04B 7/0456; H04B 7/0626; H04B 7/0639; H04B 7/0617; H04B 7/0632;
(Continued)

(56) References Cited

U.S. PATENT DOCUMENTS

2011/0243272 A1* 10/2011 Hammarwall ......... H04B 7/065 375/296
2012/0039207 A1* 2/2012 Eriksson ............. H04L 25/0202 370/252

(Continued)

FOREIGN PATENT DOCUMENTS

WO 2020254858 A1 12/2020
WO 2022018485 A1 1/2022
WO 2022084726 A1 4/2022

OTHER PUBLICATIONS

International Search Report and Written Opinion of the International Searching Authority mailed Mar. 22, 2022 for International Application No. PCT/IB2021/055461, 10 pages.

(Continued)

*Primary Examiner* — Nimesh Patel
(74) *Attorney, Agent, or Firm* — Sage Patent Group

(57) ABSTRACT

A method, system and apparatus are disclosed. According to one or more embodiments, a network node is provided. The network node includes processing circuitry configured to determine a precoder using one of wideband channel state information and frequency-dependent channel state information based on at least one mobility estimate, and cause transmission to a wireless device using the determined precoder.

14 Claims, 8 Drawing Sheets

(58) Field of Classification Search
CPC .. H04B 7/0413; H04B 7/0486; H04B 7/0619; H04B 7/0695; H04B 7/088; H04B 7/0452; H04B 7/046; H04B 7/0663; H04B 7/0689; H04B 7/0417; Y02D 30/70; H04W 72/23; H04W 36/00698; H04W 36/0072; H04W 36/302; H04W 8/02; H04W 8/12; H04W 72/0453; H04W 72/121; H04W 16/28; H04W 72/0473; H04W 72/51; H04L 5/0048; H04L 1/0026; H04L 5/005; H04L 5/0023; H04L 5/0053; H04L 5/0057; H04L 5/0094; H04L 27/2613; H04L 5/0007; H04L 5/0035; H04L 5/0085; H04L 25/0202
See application file for complete search history.

(56) References Cited

U.S. PATENT DOCUMENTS

2018/0006700 A1* 1/2018 Frenne ................. H04B 7/0626
2018/0145809 A1* 5/2018 Kwak ................. H04L 25/0228
2020/0213053 A1* 7/2020 Faxér .................... H04L 5/0023
2020/0274603 A1* 8/2020 Zhang ....................... H04L 1/06
2020/0358493 A1* 11/2020 Hao ...................... H04L 5/0048
2022/0302978 A1* 9/2022 Guo ..................... H04B 7/0621

OTHER PUBLICATIONS

Lee, Hyunjoong et al.; "An opportunistic scheduling algorithm using aged CSI in massive MIMO system"; Computer Networks, vol. 129; Dec. 24, 2017; XP085283739; pp. 284-296 (13 pages).
Venugopal, Kiran et al.; "Optimality of Frequency Flat Precoding in Frequency Selective Millimeter Wave Channels"; IEEE Wireless Communications Letters, vol. 6, No. 3; Jun. 2017, 4 pages.
Mi, De et al., "Massive MIMO Performance with Imperfect Channel Reciprocity and Channel Estimation Error", IEEE Transactions on Communications, vol. 65, No. 9; Sep. 2017; 16 pages.
LG Electronics; "Discussion on diversity achieving schemes"; R1-1700469; 3GPP TSG RAN WG1 NR-AdHoc Meeting, Agenda Item 5.1.2.1; Spokane, Washington, USA; Jan. 16-20, 2017; XP051202893; 7 pages.

* cited by examiner

DOWNLINK PRECODING SWITCHING BASED ON CHANNEL VARIATION ESTIMATES

CROSS-REFERENCE TO RELATED APPLICATIONS

This application is a 35 U.S.C § 371 national stage application for International Application No. PCT/IB2021/055461, entitled "DOWNLINK PRECODING SWITCHING BASED ON CHANNEL VARIATION ESTIMATES", filed on Jun. 21, 2021, assigned to the assignee hereof, and expressly incorporated herein by reference.

TECHNICAL FIELD

The present disclosure relates to wireless communications, and in particular, to a precoding determination and/or implementation based at least on channel variation estimates.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Massive multiple input multiple output (MIMO) transmission in, for example, 3GPP based systems utilizes spatial multiplexing to enhance the spectral efficiency of the system. Downlink spatial multiplexing can be implemented by precoding the transmission from different network node antennas and jointly processing the received signals from different wireless device antennas such that the mutual interference among different transmission layers is eliminated. The downlink precoder can be designed using the instantaneous channel estimates for each subband, and hence, optimal frequency selective precoding can be applied leading to improved performance. The downlink precoder can also be designed using wideband channel information, e.g., via Type-1 codebook-based feedback from the wireless device or by using the dominant eigen vectors of the downlink channel covariance matrix, leading to improved robustness to channel estimation errors and/or wireless device mobility when compared to previous systems.

Existing reciprocity-based downlink precoding schemes can utilize the instantaneous uplink channel estimates to design the precoders for downlink transmission. The channel estimates are obtained from uplink reference symbols that are transmitted by the wireless device in prior uplink transmission slots. However, as the speed of the wireless device increases and/or as the period of uplink reference symbols transmission increases, the accuracy of the channel estimates degrades. This may lead to significant performance degradation in the downlink throughput.

Further, wideband precoding algorithms utilize the channel covariance matrix and/or wideband precoder matrix feedback from the wireless device to design wideband precoders for downlink transmissions. Even though these precoding techniques have improved robustness against channel variation when compared to other existing techniques, the performance degradation compared to frequency-selective precoding can be large especially in channels with large delay spread.

Therefore, while some existing downlink precoding schemes help improve robustness again channel variation in some cases, these schemes still suffer from performance degradation when the channel variation exceeds a threshold.

SUMMARY

Some embodiments advantageously provide methods, systems, and apparatuses for a precoding determination and/or implementation based at least on channel variation estimates.

One or more embodiments described herein utilize an estimate of the channel variation coefficient obtained from multiple uplink reference signals (e.g., successive uplink reference signals) to switch between frequency-selective and wideband precoding techniques. The switching algorithm is illustrated to provide improved performance compared to both precoding techniques at different wireless device speed. In one or more embodiments, the algorithm utilizes two thresholds for switching between the two precoding schemes to avoid hysteresis. Simulation results illustrated that the switching algorithm described herein provides performance very close to that of a best precoding scheme (frequency-selective or wideband) at different wireless device speed. Furthermore, simulation results illustrate that the algorithm is not sensitive to the selection of the switching thresholds.

According to one aspect of the disclosure, a network node is provided. The network node includes processing circuitry configured to determine a precoder using one of wideband channel state information and frequency-dependent channel state information based on at least one mobility estimate, and cause transmission to a wireless device using the determined precoder.

According to one or more embodiments of this aspect, the processing circuitry is further configured to determine the precoder by selecting, based on the at least one mobility estimate where one of a wideband precoder is based on wideband channel state information and a narrow-band precoder is based on frequency-dependent channel state information. According to one or more embodiments of this aspect, the at least one mobility estimate includes a channel variation coefficient, CVC, estimate where the CVC estimate is based at least on a plurality of uplink reference signals. According to one or more embodiments of this aspect, the wideband precoder is selected based at least on the CVC estimate being above a threshold.

According to one or more embodiments of this aspect, the wideband precoder is a wideband direct single value decomposition, SVD, precoder. According to one or more embodiments of this aspect, the wideband precoder is a wideband direct polarized single value decomposition, SVD, precoder. According to one or more embodiments of this aspect, the wideband precoder is applied to a bandwidth corresponding to a group of subbands. According to one or more embodiments of this aspect, the narrow-band precoder is selected based at least on the CVC estimate is less than a threshold.

According to one or more embodiments of this aspect, the narrow-band precoder is an indirect single value decomposition, SVD, minimum mean square error, MMSE, precoder. According to one or more embodiments of this aspect, the narrow-band precoder is an indirect polarized single value decomposition, SVD, minimum mean square error, MMSE, precoder. According to one or more embodiments of this aspect, the narrow-band precoder is applied to a bandwidth corresponding to a single subband. According to one or more embodiments of this aspect, the precoder is a previously implemented precoder that is selected based at least on the CVC estimate being equal to a threshold.

According to another aspect of the disclosure, a method implemented by a network node is provided. A precoder is determined using one of wideband channel state information and frequency-dependent channel state information based on at least one mobility estimate, and transmission is caused to a wireless device using the determined precoder.

According to one or more embodiments of this aspect, the precoder is determined by selecting, based on the at least one mobility estimate where one of a wideband precoder is based on wideband channel state information and a narrow-band precoder is based on frequency-dependent channel state information. According to one or more embodiments of this aspect, the at least one mobility estimate includes a channel variation coefficient, CVC, estimate where the CVC estimate is based at least on a plurality of uplink reference signals. According to one or more embodiments of this aspect, the wideband precoder is selected based at least on the CVC estimate being above a threshold.

According to one or more embodiments of this aspect, the wideband precoder is a wideband direct single value decomposition, SVD, precoder. According to one or more embodiments of this aspect, the wideband precoder is a wideband direct polarized single value decomposition, SVD, precoder. According to one or more embodiments of this aspect, the wideband precoder is applied to a bandwidth corresponding to a group of subbands.

According to one or more embodiments of this aspect, the narrow-band precoder is selected based at least on the CVC estimate being less than a threshold. According to one or more embodiments of this aspect, the narrow-band precoder is an indirect single value decomposition, SVD, minimum mean square error, MMSE, precoder. According to one or more embodiments of this aspect, the narrow-band precoder is an indirect polarized single value decomposition, SVD, minimum mean square error, MMSE, precoder.

According to one or more embodiments of this aspect, the narrow-band precoder is applied to a bandwidth corresponding to a single subband. According to one or more embodiments of this aspect, the precoder is a previously implemented precoder that is selected based at least on the CVC estimate being equal to a threshold.

According to another aspect of the disclosure, a computer readable medium is provided. The computer readable medium includes processing instructions that when executed by a processor, cause the processor to determine a precoder using one of wideband channel state information and frequency-dependent channel state information based on at least one mobility estimate, and cause transmission to a wireless device using the determined precoder.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
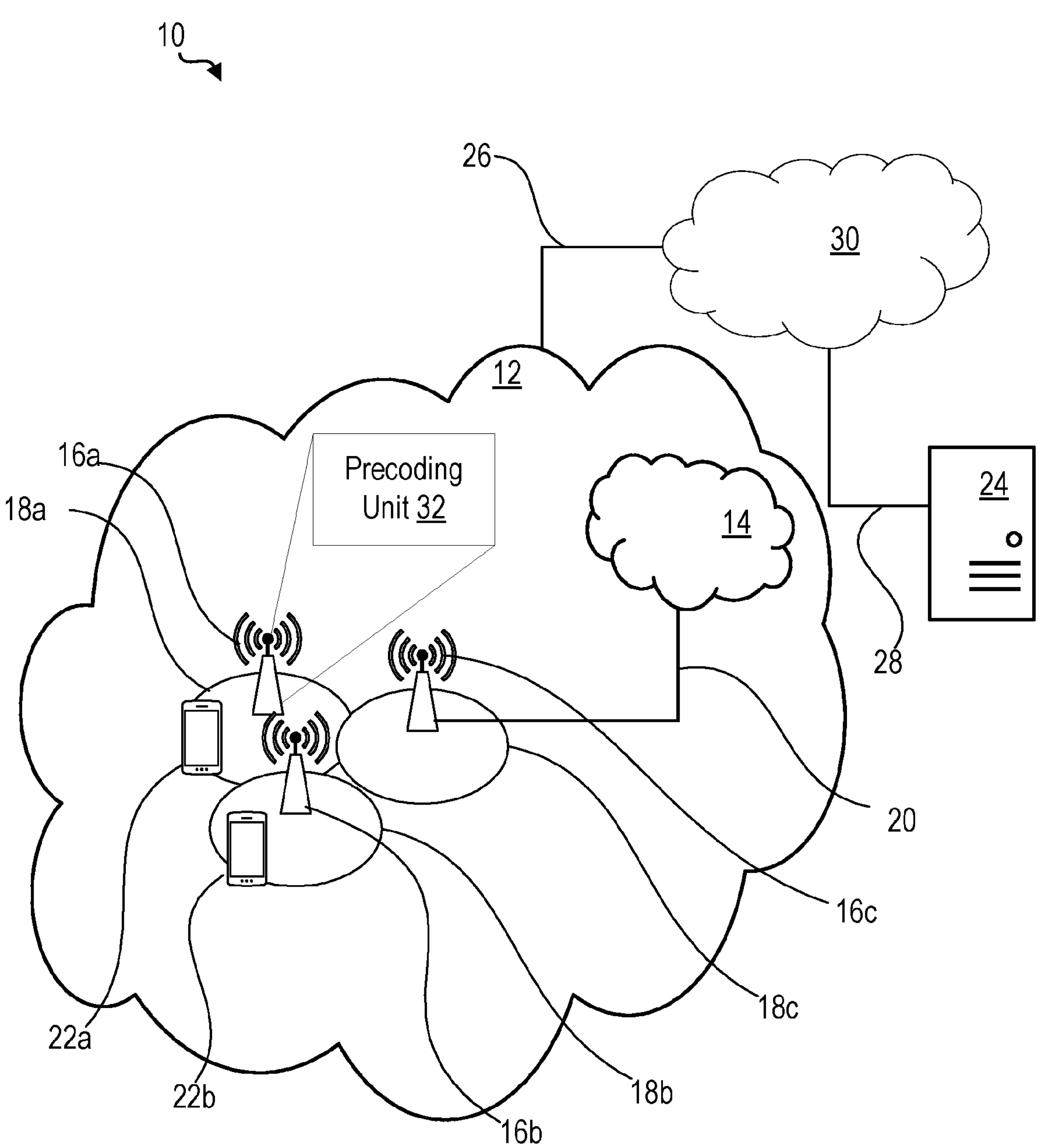
FIG. 1 is a schematic diagram of an exemplary network architecture illustrating a communication system according to the principles in the present disclosure.

Before describing in detail exemplary embodiments, it is noted that the embodiments reside primarily in combinations of apparatus components and processing steps related to precoding determination based at least on channel variation estimates. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-TOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide a precoding determination and/or implementation based at least on channel variation estimates.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a precoding unit 32 which is configured to perform one or more network node 16 functions as described herein such as with respect to a precoding determination and/or implementation based at least on channel variation estimates.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, store, analyze, process, forward, relay, transmit, receive, etc., information related to precoding determination based at least on channel variation estimates.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72 (e.g., a computer readable medium), or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include precoding unit 32 configured to perform one or more network node 16 functions as described herein such as with respect to a precoding determination and/or implementation based at least on channel variation estimates.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
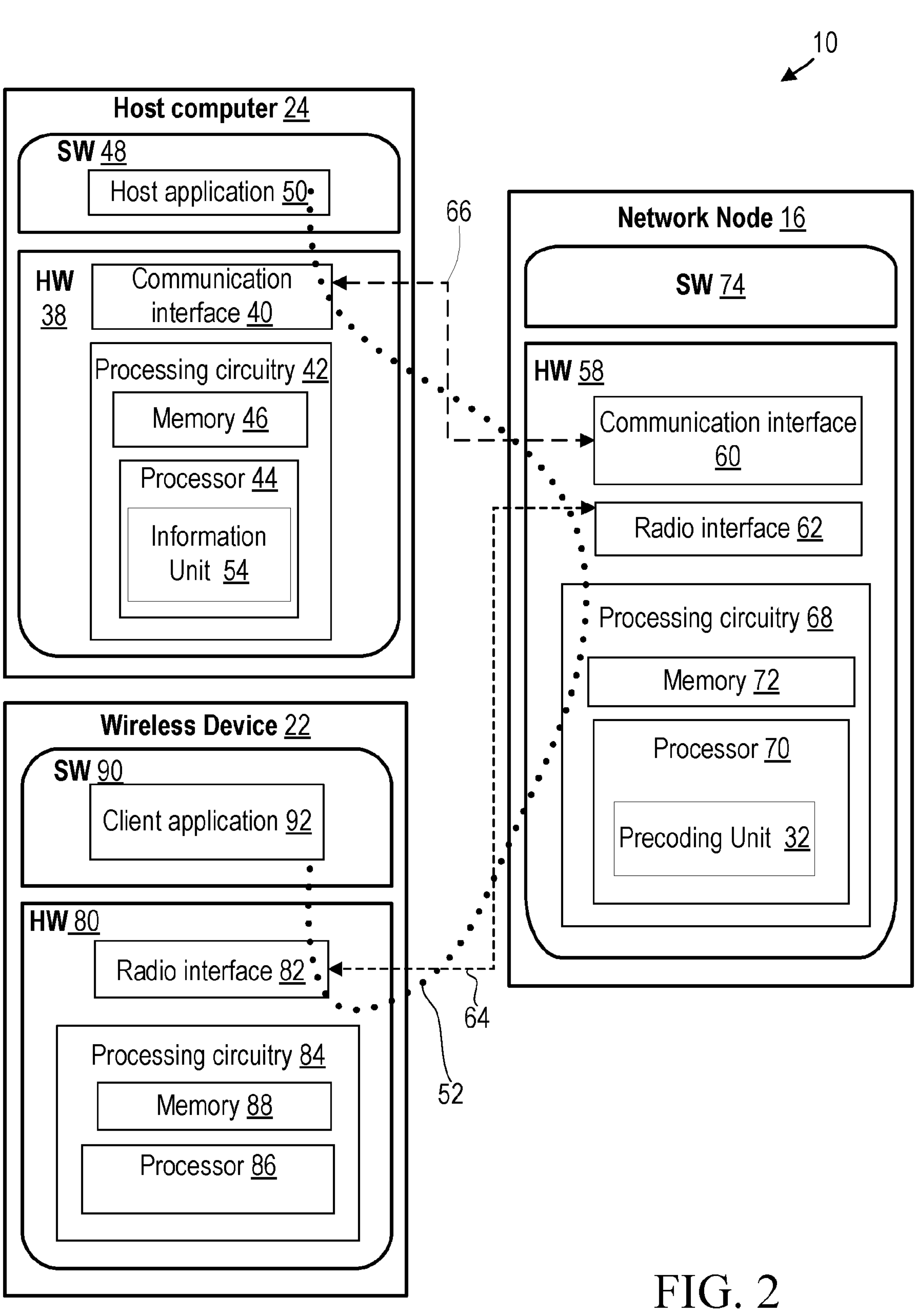
FIG. 2 is a block diagram of a portion of the communication system according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show "unit" such as precoding unit 32 as being within a respective processor, it is contemplated that this unit (and other units not shown) may be implemented such that a portion of the unit is stored in a corresponding memory within the processing circuitry. In other words, the unit may be implemented in hardware or in a combination of hardware and software within the processing circuitry.

Figures 3, 4:
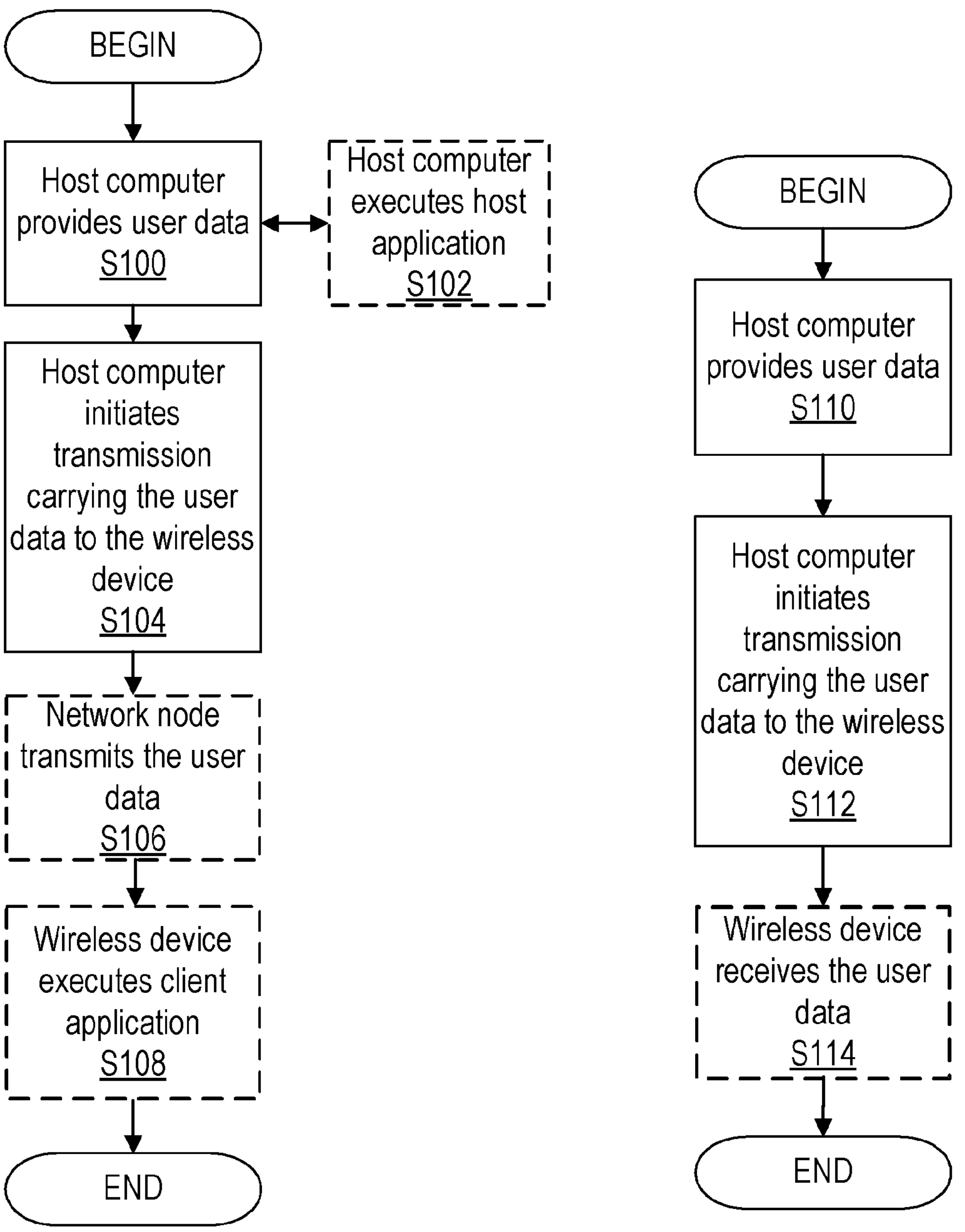
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block 8114).

Figures 5, 6:
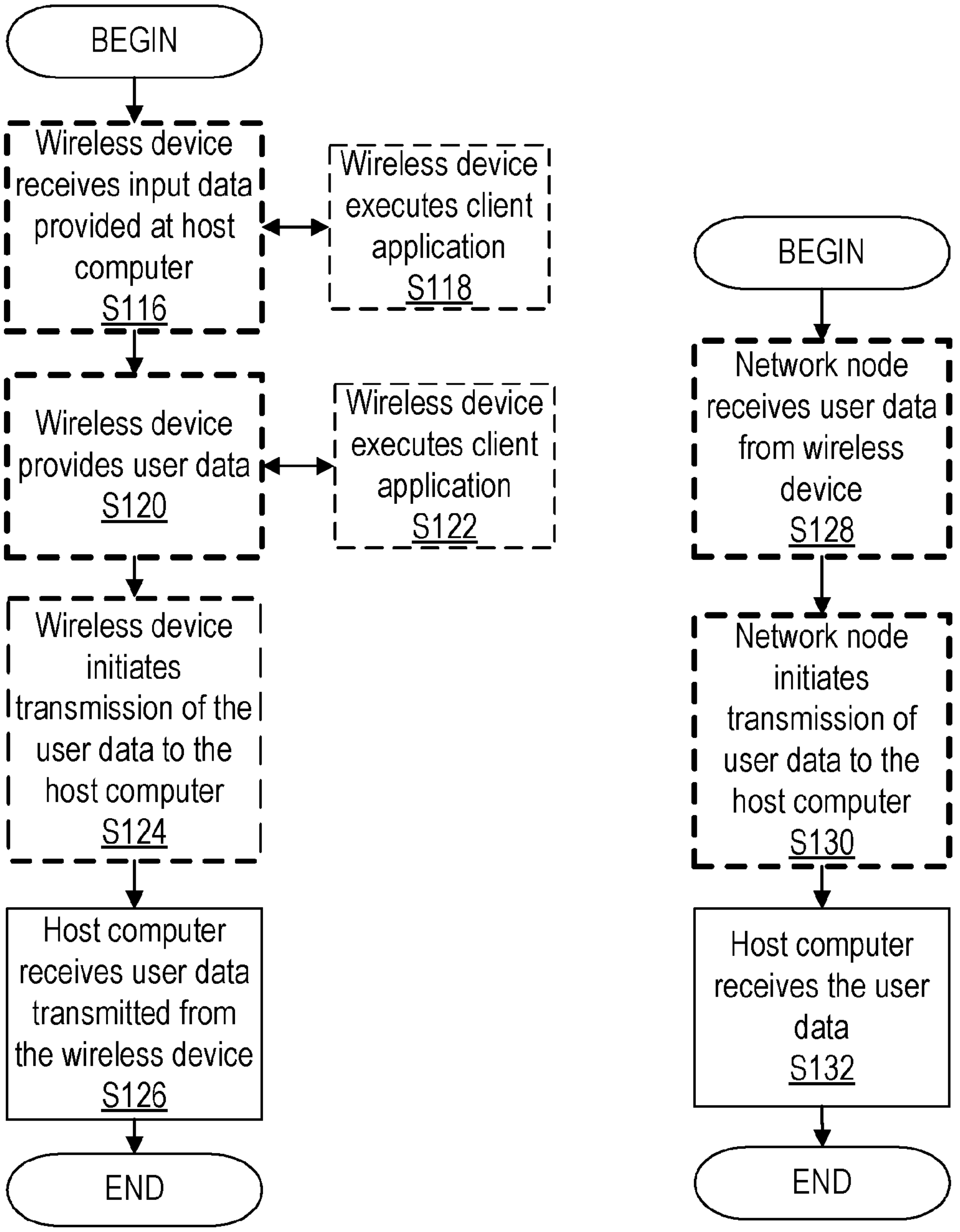
FIG. 5 is a flowchart illustrating exemplary methods implemented in a communication system including a host computer, a network node and a wireless device for receiving user data from the wireless device at a host computer according to some embodiments of the present disclosure.
FIG. 6 is a flowchart illustrating exemplary methods implemented in a communication system including a host computer, a network node and a wireless device for receiving user data at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block 8118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
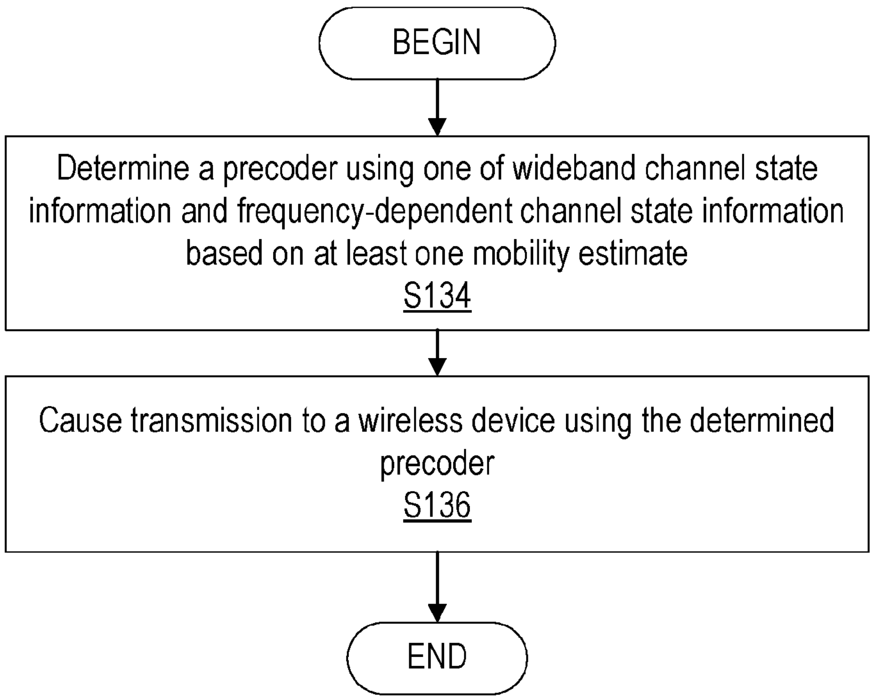
FIG. 7 is a flowchart of an exemplary process in a network node according to some embodiments of the present disclosure.

FIG. 7 is a flowchart of an exemplary process in a network node 16 for according to some embodiments of the present disclosure. One or more blocks described herein may be performed by one or more elements of network node 16 such as by one or more of processing circuitry 68 (including the precoding unit 32), processor 70, radio interface 62 and/or communication interface 60. Network node 16 is configured to determine (Block S134) a precoder using one of wideband channel state information (CSI) and frequency-dependent channel state information based on at least one mobility estimate, as described herein. Network node 16 is configured to cause (Block S136) transmission to a wireless device 22 using the determined precoder, as described herein.

According to one or more embodiments, the processing circuitry 68 is further configured to determine the precoder by selecting, based on the at least one mobility estimate where one of a wideband precoder is based on wideband channel state information and a narrow-band precoder is based on frequency-dependent channel state information. According to one or more embodiments, the at least one mobility estimate includes a channel variation coefficient, CVC, estimate, the CVC estimate being based at least on a plurality of uplink reference signals. According to one or more embodiments, the wideband precoder is selected based at least on the CVC estimate being above a threshold.

According to one or more embodiments, the wideband precoder is a wideband direct single value decomposition, SVD, precoder.

According to one or more embodiments, the wideband precoder is a wideband direct polarized single value decomposition, SVD, precoder. According to one or more embodiments, the wideband precoder is applied to a bandwidth corresponding to a group of subbands. According to one or more embodiments, the narrow-band precoder is selected based at least on the CVC estimate is less than a threshold. According to one or more embodiments, the narrow-band precoder is an indirect single value decomposition, SVD, minimum mean square error, MMSE, precoder.

According to one or more embodiments, the narrow-band precoder is an indirect polarized single value decomposition, SVD, minimum mean square error, MMSE, precoder. According to one or more embodiments, a narrow-band precoder is applied to a bandwidth corresponding to a single subband. According to one or more embodiments, the precoder is a previously implemented precoder that is selected based at least on the CVC estimate being equal to a threshold.

According to one or more embodiments, a computer readable medium 72, e.g., memory, is provided. The computer readable medium 72 includes processing instructions that when executed by a processor 70, cause the processor 70 to determine a precoder using one of wideband channel state information and frequency-dependent channel state information based on at least one mobility estimate, and cause transmission to a wireless device 22 using the determined precoder.

Having generally described arrangements for a precoding determination and/or implementation based at least on channel variation estimates, details for these arrangements, functions and processes are provided as follows, and which may be implemented by the network node 16, wireless device 22 and/or host computer 24.

Some embodiments provide a precoding determination and/or implementation based at least on channel variation estimates. One or more network node 16 functions described below may be performed by one or more of processing circuitry 68, processor 70, precoding unit 32, radio interface 62, etc.

System Model

Network node 16 employing an N-element antenna array communicating with a wireless device 22 equipped with M receive antennas is considered. Let the M×N matrix H(f, t) denote the matrix containing the coefficients of the downlink channel from network node 16 to wireless device 22 at frequency f and time instant t. In time-division duplex systems where channel reciprocity can be assumed, the channel estimates are available at network node 16, e.g., from uplink channel sounding transmissions, and are used by network node 16 to select the precoding coefficients to transmit downlink data. The channel estimates can also be obtained using quantized feedback from wireless device 22 to be used by network node 16 in downlink precoding, e.g., Type 1 and Type 2 codebook-based beamforming in NR.

Network node 16 utilizes an N×L precoding matrix $\tilde{W}(f, t)$ to transmit L≤min{M, N} spatial layers (streams) to wireless device 22. It is assumed that the matrix $\tilde{W}(f, t)$ is normalized such that $\tilde{w}_i^H(f, t)\,\tilde{w}_i(f, t)=1/L$ for i=1, . . . , L where $\tilde{w}_i(f, t)$ denotes the ith column of the matrix $\tilde{W}(f, t)$ and $(\ )^H$ denotes the Hermitian transpose of a matrix. The M×1 received signal vector at wireless device 22 is given by $$y(f, t) = H(f, t)\tilde{W}(f, t)\ A(f, t)\ s(f, t) + n(f, t)$$

where $s(f, t)=[s_0(f, t) \ldots s_{L-1}(f, t)]^T$ is the L×1 transmitted symbol vector, $(\ )^T$ denotes the transpose of a matrix, the L×L diagonal matrix A(f, t) is given by $A(f, t)=\mathrm{diag}\{\sqrt{p_1}, \sqrt{p_2}, \ldots, \sqrt{p_L}\}$, $p_L$ is the power allocated to the ith layer, and n(f, t) is the received interference-plus-noise vector at wireless device 22.

Downlink Precoding

Several techniques have been proposed to compute the downlink precoding matrix $\tilde{W}(f, t)$. In this section, some precoders that are relevant to the proposed algorithm are described.

Per-Subband Precoding Techniques

Per-Subband SVD Precoding

Let the singular value decomposition (SVD) of the downlink channel matrix estimate H(f, t) be given by $$H(f,t)=U(f,t)\Sigma(f,t)V^H(f,t)$$

where U(f, t) is the M×M matrix containing the left singular vectors of the H(f, t), Σ(f, t) is the M×N diagonal matrix containing the singular values and V(f, t) is the N×N matrix containing the right singular vectors. In particular, H(f, t) may correspond to frequency-dependent CSI. The rank-L per-subband SVD precoding matrix is selected as $$\tilde{W}(f, t) = \frac{1}{\sqrt{L}}\tilde{V}(f, t)$$

where $\tilde{V}(f, t)=[\tilde{v}_1(f, t), \ldots, \tilde{v}_L(f, t)]$ is the N×L matrix containing the first L columns of the matrix V(f, t), i.e., the columns corresponding to the L-largest singular values.

In another embodiment of the algorithm, the SVD of the channel can be pre-computed using old channel estimates to allow for more processing time for computing the SVD, i.e., $$\tilde{W}(f, t) = \frac{1}{\sqrt{L}}\tilde{V}(f, t-D)$$

where D is the delay in the utilized channel estimates for precoder calculation.

Note that the complexity of per-subband SVD precoding is relatively high compared to existing techniques as the SVD of each subband is computed. In the next subsections, several precoding algorithms that utilize averaging over different subbands and different polarizations to reduce the number of required SVD computations are described. Nevertheless, the resulting precoder may still be per-subband.

Indirect SVD MMSE Precoding

It may be assumed that the matrix $H(f, t)H^H(f, t)$ is constant over a group of subbands of size F. For the $\mathcal{F}$th group of subbands, the N×N receive covariance matrix is computed as follows:

$$C_{RX}(\mathcal{F}, t-D) = \frac{1}{F}\sum_{f\in\mathcal{F}} H(f, t-D)H^H(f, t-D)$$

Let [U($\mathcal{F}$, t−D), Λ($\mathcal{F}$, t−D)] denote the eigen decomposition of the covariance matrix $C_{RX}(\mathcal{F}, t-D)$. In particular, $C_{RX}(\mathcal{F}, t)$ may corresponds to wideband CSI. The L×M matrix corresponding to the downlink channel after port mixing/selection is compuated as follows:

$$\tilde{H}(f,t)=\tilde{\Lambda}^{-\frac{1}{2}}(\mathcal{F},t-D)\tilde{U}^{H}(\mathcal{F},t-D)H(f,t)$$

where $\tilde{U}^H(\mathcal{F}, t-D)=[\tilde{u}_1(\mathcal{F}, t-D), \ldots, \tilde{u}_L(\mathcal{F}, t-D)]$ is the M×L matrix containing the L eigen vectors (corresponding to the L-largest eigen values) of $C_{RX}(\mathcal{F}, t-D)$ and $\tilde{\Lambda}(\mathcal{F}, t-D)$ is the L×L diagonal matrix containing the corresponding eigen values on its main diagonal. Note that the processed channel matrix $\tilde{H}(f, t)$ may utilize the information in the covariance matrix $C_{RX}(\mathcal{F}, t-D)$ to perform port/selection only and the instantaneous per-subband channel H(f, t) is still utilized to compute $\tilde{H}(f, t)$.

Next, the unnormalized minimum mean square error (MMSE) precoder is computed from $\tilde{H}(f, t)$ as $$W(f,t)=\tilde{H}^{H}(f,t)\left(\tilde{H}(f,t)\tilde{H}^{H}(f,t)+\delta^{2}(f,t)I_{L}\right)^{-1}$$

where $\delta^2(f, t)$ is the MMSE regularization factor and $I_L$ is the L×L identity matrix. The rank rank-L precoder for each subband $f \in \mathcal{F}$ is given by $\tilde{W}(f, t)$ and obtained from the matrix W(f, t) by scaling each of its columns such that its norm is equal to $$\frac{1}{\sqrt{L}}.$$

Indirect Polarized SVD MMSE Precoding

For wireless devices 22 with polarized receive antennas, the N×M downlink channel matrix may be written as follows:

$$H(f,t)=\begin{bmatrix}H^{(0)}(f,t)\\ H^{(1)}(f,t)\end{bmatrix}$$

where $H^{(p)}(f, t)$ is the $$\frac{N}{2}\times M$$

matrix for wireless device 22 receive antennas with polarization p at time slot t. It may be assumed that wireless device 22 receive antennas has near-ideal cross-polarization discrimination. Hence, the N×N receive covariance matrix $C_{RX}(\mathcal{F}, t)$ can be approximated as $$C_{RX}(\mathcal{F},t-D)=\begin{bmatrix}C_{RX}^{(0,0)}(\mathcal{F},t-D) & 0\\ 0 & C_{RX}^{(1,1)}(\mathcal{F},t-D)\end{bmatrix}$$

where $C_{RX}^{(p,q)}(\mathcal{F},t)=\frac{1}{F}\sum_{f\in\mathcal{F}}H^{(p)}(f,t)\,H^{(q)^{H}}(f,t)$ is the $\frac{N}{2}\times\frac{N}{2}$ wjere $$C_{RX}^{(p,q)}(\mathcal{F},t)=\frac{1}{F}\sum_{f\in\mathcal{F}}H^{(p)}(f,t)H^{(q)^{H}}(f,t)$$

is the $$\frac{N}{2}\times\frac{N}{2}$$

receive cross-covariance matrix for polarizations p and q, and $$C_{RX}^{(0,1)}(\mathcal{F},t)=C_{RX}^{(1,0)}(\mathcal{F},t)\approx 0.$$

As a result, the eigen decomposition [U($\mathcal{F}$, t−D), Λ($\mathcal{F}$, t−D)] of the receive covariance matrix $C_{RX}(\mathcal{F}, t-D)$ is given by $$U(\mathcal{F},t-D)=\begin{bmatrix}U^{(0)}(\mathcal{F},t-D) & 0\\ 0 & U^{(1)}(\mathcal{F},t-D)\end{bmatrix}\Lambda(\mathcal{F})=\begin{bmatrix}\Lambda^{(0)}(\mathcal{F},t-D) & 0\\ 0 & \Lambda^{(1)}(\mathcal{F},t-D)\end{bmatrix}$$

where $[U^{(p)}(T, t), \Lambda^{(p)}(\mathcal{F}, t)]$ is the eigen decomposition of $$C_{RX}^{(p,p)}(\mathcal{F},t).$$

This approach has the advantage of replacing the eigen decomposition of the N×N receive covariance matrix required during calculating the indirect SVD MMSE precoder by two eigen decompositions of the $$\frac{N}{2}\times\frac{N}{2}$$

per polarization receive cross-covariance matrices $$C_{RX}^{(0,0)}(\mathcal{F},t-D)\text{ and }C_{RX}^{(1,1)}(\mathcal{F},t-D).$$

The rank-L downlink channel matrix after port selection/mixing is given by the L×M matrix $$\tilde{H}(f,t)=\tilde{\Lambda}^{-\frac{1}{2}}(\mathcal{F},t-D)\tilde{U}^{H}(\mathcal{F},t-D)H(f,t)$$

where the matrix $\tilde{U}(f, t)$ is formed from the L columns of the matrix U($\mathcal{F}$, t) corresponding to the L-largest eigen values in $\Lambda^{(0)}(\mathcal{F}, t-D)$ and $\Lambda^{(1)}(\mathcal{F}, t-D)$ and the matrix $\tilde{\Lambda}(\mathcal{F}, t)$ is the L×L diagonal matrix containing these eigen values.

Wideband Precoding

In these precoding schemes, the precoding matrix is constant over a group of subbands of size F. Note that the subband group size can be as large as the full bandwidth of the downlink.

Wideband Direct SVD Precoding

It is assumed that $H^H(f,t)H(f,t)$ is constant over a group of subbands of size F. For the $\mathcal{F}$ th group of subbands, wideband M×M delayed transmit covariance matrix for a group of subbands of size F is computed as follows:

$$C_{TX}(\mathcal{F}, t-D) = \frac{1}{F}\sum_{f\in\mathcal{F}} H^H(f, t-D)H(f, t-D)$$

where $C_{TX}(\mathcal{F}, t)$ may correspond to wideband CSI.

The rank-L precoder for each subband $f\in\mathcal{F}$ is given by $$\tilde{W}(f, t) = \frac{1}{\sqrt{L}}\tilde{V}(\mathcal{F}, t-D)$$

where $\tilde{V}(\mathcal{F}, t-D)$ is the N×L matrix containing the dominant L eigen vectors (corresponding to the L largest eigen values) of $C_{TX}(\mathcal{F}, t-D)$.

Wideband Direct Polarized SVD Precoding

The indirect polarized SVD MMSE precoding method described above exploits the polarized structure of the antenna array of wireless device 22 to reduce the complexity of direct SVD precoding. The same idea can be utilized for direct SVD precoding when network node 16 is equipped with polarized antennas. In this case, the N×M downlink channel matrix can be written as $H(f,t)=[H^{(0)}(f,t)\ H^{(1)}(f,t)]$ where $H^{(p)}(f,t)$ is the $$N\times\frac{M}{2}$$

downlink channel matrix for the downlink transmit antennas with polarization p at time slot t. Instead of computing the full M×M transmit covariance matrix $$C_{TX}(\mathcal{F}, t-D), \text{ the } \frac{M}{2}\times\frac{M}{2}$$

per-polarization averaged and delayed transmit covariance matrix for a group of subbands of size F is computed as follows:

$$C_{TX}^{(Av)}(\mathcal{F}, t-D) = \frac{1}{2F}\sum_{p=0,1}\sum_{f\in\mathcal{F}} H^{(p)^H}(f, t-D)H^{(p)}(f, t-D)$$

Next, the $$\frac{M}{2}\times 1$$

1-dimensional eigen vectors of $$C_{TX}^{(Av)}(\mathcal{F}, t-D)$$

corresponding to the $$\left\lceil\frac{L}{2}\right\rceil$$

largest eigen values are computed, e.g., for L=4 only the vectors $v_1(\mathcal{F}, t-D)$ and $v_2(\mathcal{F}, t-D)$ corresponding to the first and second eigen vectors of $$C_{TX}^{(Av)}(\mathcal{F}, t-D)$$

may be computed.

The rank-L precoding matrix can be constructed from the $$\left\lceil\frac{L}{2}\right\rceil$$

eigen vectors $v_i(\mathcal{F}, t-D)$ by applying co-phasing factors. Hence, the ith eigen vector $v_i(\mathcal{F}, t-D)$ is utilized to compute the precoders for layer 2i−1 and 2i as $$[\tilde{w}_{2i-1}(f, t)\tilde{w}_{2i}(f, t)] = \frac{1}{\sqrt{2L}}\begin{bmatrix} v_i(\mathcal{F}, t-D) & v_i(\mathcal{F}, t-D) \\ e^{j\varphi_i}v_i(\mathcal{F}, t-D) & -e^{j\varphi_i}v_i(\mathcal{F}, t-D)\end{bmatrix}$$

where $\tilde{w}_k(f,t)$ is the precoder for layer k and $\varphi_i$ is the co-phasing factor for the two polarizations associated with the ith eigen vector.

Mobility-Based Precoding Switching

In time division duplex systems, the downlink channel estimates H(f, t) are typically obtained from the uplink channel estimates (e.g., channel state information (CSI)) based on uplink/downlink channel reciprocity. The uplink channel is estimated using uplink reference signals that are periodically transmitted by wireless device 22. As a result, the accuracy of the channel estimates (CSI) decreases as the mobility of wireless device 22 increases, and hence, the beamforming gain of the downlink precoders decreases. Utilizing the covariance matrix of the channel in designing downlink precoders provides robustness against wireless device 22 mobility as the rate of change of the covariance matrix with mobility is smaller than that of the instantaneous channel estimate. However, this robustness against mobility may come at the cost of performance degradation in low mobility scenarios when the delay spread (frequency selectivity) of the channel is large. Therefore, one or more embodiments described herein advantageously switches between frequency selective precoding, e.g., narrow-band precoder, (at low mobility) and wideband precoding, e.g., wideband precoder, (at high mobility) to combat channel estimation errors resulting from wireless device 22 mobility.

Note that the wideband direct SVD precoding techniques described above may rely only on the wideband transmit covariance matrix to design the downlink beamforming coefficients. On the other hand, the indirect SVD methods described above may provide the receive covariance matrix only for mixing/selecting the instantaneous channel estimates. As a result, direct SVD precoding offers more robustness than other precoding techniques to wireless device 22 mobility while indirect SVD precoding performs better than direct SVD precoding in low mobility scenarios. In one or more embodiments, switching between direct and indirect SVD is performed based at least on an estimate of the mobility of the wireless device 22, as described herein.

Mobility Estimation

A mobility estimation algorithm is described that utilizes estimates of the uplink channels obtained from successive uplink transmitted reference signals to estimate the channel variation coefficient. Let $\hat{h}_i(f, t)$ denote the N×1 vector representing the estimate of the uplink channel at frequency f from transmission port i of wireless device 22 to network node 16 obtained from uplink reference signals transmitted at time t.

The algorithm relies on the assumption that $\hat{h}_i(f, t)$ for all i=1, . . . , M follows a first-order auto-regressive model:

$$\hat{h}_i(f, t) = \alpha\, \hat{h}_i(f, t-1) + e(t)$$

where e(t) is circular Gaussian random vector. Hence, given two reference signal transmissions from the same wireless device 22 transmission antenna at time slots t−k and t, there is $\hat{h}_i(f, t-k)$ and $\hat{h}_i(f, t)$. A known algorithm estimates $\hat{\alpha}^k(t)$ from the Yule-Walker equations by calculating the expectations via frequency averaging to get $$\hat{\alpha}^k(t) = \frac{\Sigma_f \hat{h}_i^H(f, t-k)\hat{h}_i(f, t)}{\sqrt{\Sigma_f \|\hat{h}_i(f, t-k)\|^2}\sqrt{\Sigma_f \|\hat{h}_i(f, t)\|^2}}$$

Next, $|\hat{\alpha}(t)|$ is computed from the estimated $\hat{\alpha}^k(t)$ and utilized to update a time-filtered estimate of the AR coefficient, $|\hat{\alpha}|$, using a first-order filter, i.e., $$|\tilde{\alpha}| = \beta|\tilde{\alpha}| + (1-\beta)|\hat{\alpha}(t)| \text{ where } \beta = e^{-\frac{t-t_0}{W}},$$

$t_0$ is the subframe index of last update of $|\hat{\alpha}|$, and W is the effective memory length of the filter. The channel variation coefficient is therefore given by $$CVC = 1 - |\tilde{\alpha}|.$$

Channel Variation-Based Switching Algorithm

Figure 8:
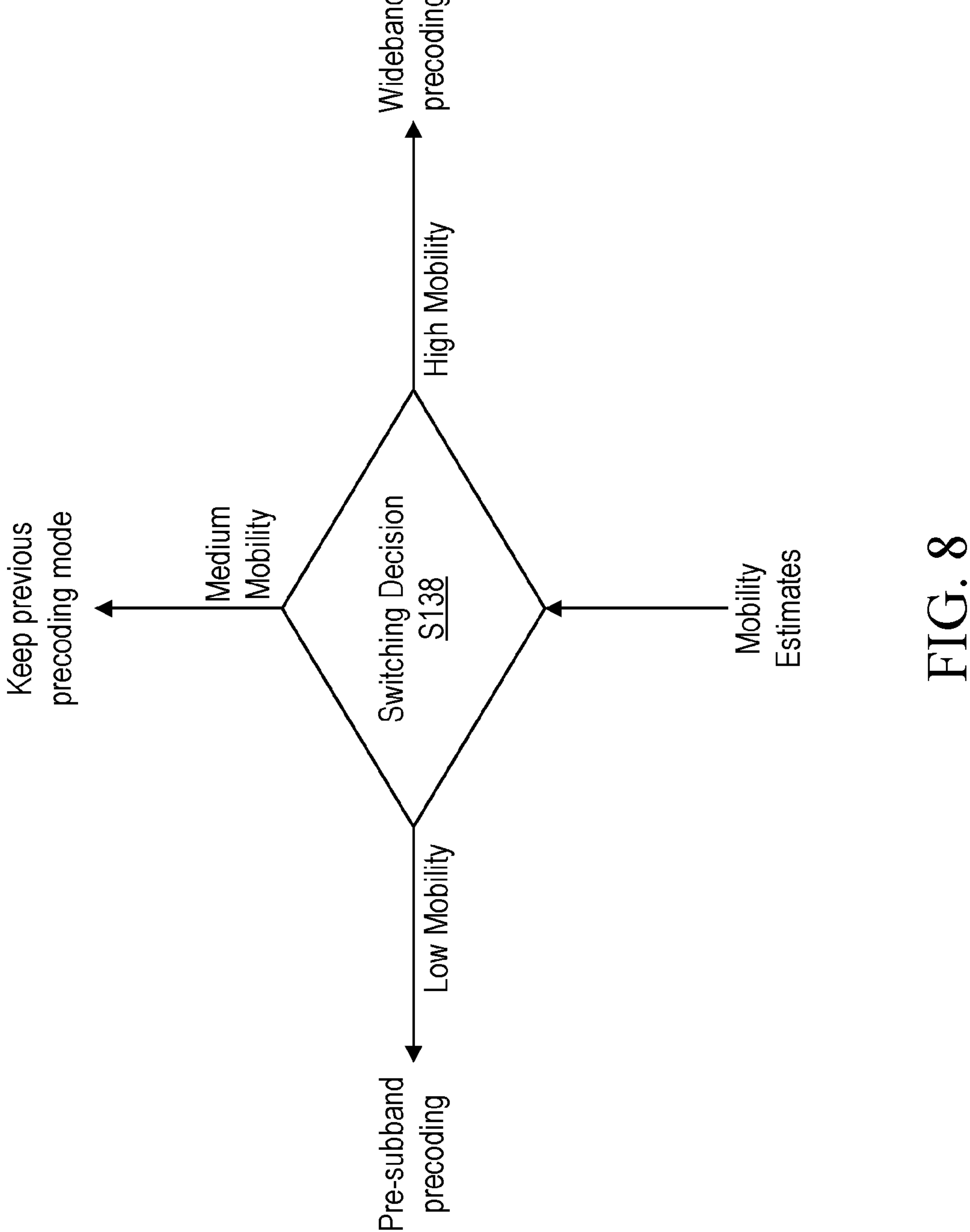
FIG. 8 is a diagram of a precoding switching algorithm according to some embodiments of the present disclosure.

FIG. 8 is a block diagram of an example precoding mode switching algorithm according to some embodiments of the present disclosure. The precoding mode switching algorithm that is implemented by network node 16 utilizes the mobility estimate, e.g., CVC, to switch (Block S138) (and/or to make a determination or decision to switch) between frequency-selective precoding (also referred to as narrow-band precoding) and wideband precoding as follows:

If CVC>$\gamma_U$: use wideband beamforming, e.g., Direct SVD precoding;

The determination to implement wideband precoding over narrow-band precoding and the same previous precoding helps provide improved performance for wireless device 22 having high mobility when compared to other precoding schemes;

Else if CVC<$\gamma_L$: use frequency selective precoding, e.g., Indirect SVD precoding;

In particular, a narrow-band precoding is implemented for wireless device 22 having low mobility as the narrow-band precoding helps provide improved performance over other precoding schemes during low mobility situations.

Else keep the same precoder used in a previous transmission;

This situation may correspond to a wireless device 22 having medium mobility, where switching to wideband precoding or narrow-band precoding may not increase performance or may decrease performance compared to keeping a previous precoding mode.

where $\gamma_U$ and $\gamma_L$ are the upper and lower thresholds for switching. Therefore, network node 16 switches precoders where respective precoders use and/or are based on respective channel state information, i.e., a wideband precoder uses and is based on wideband channel state information while a narrow-band precoder uses and is based on narrow-band or frequency-dependent channel state information.

In one or more embodiments, network node 16 is configured to determine the mobility estimates (i.e., perform mobility estimation). Alternatively, network node 16 may be provided with mobility estimates to use. Further, in one or more embodiments, CVC Performance Evaluation The performance of one of more embodiments of the present disclosure are illustrated using system-level simulations. A 5G cellular system with bandwidth 20 MHz, subcarrier spacing 30 KHz, and carrier frequency 3.5 GHz is simulated. The system operates in time division duplex mode where the Downlink/Uplink timeslot pattern is 3/1. A multi-cell deployment scenario with 3 sites with inter-site distance 166 meters is considered where each site has 3 cells. In this scenario, 36 wireless devices 22 are dropped at random locations in the simulation area. The 5G spatial channel model (SCM) Urban Macro channel model with non-line of sight (NLOS) communication is used in this simulation. The antenna configuration at network node 16 is the AAS AIR 6488 (4×8×2) configuration while each wireless device 22 is equipped with 4 antennas. Channel estimates are obtained from uplink sounding reference symbols (SRS) that are transmitted from each wireless device 22 antenna separately. The SRS period is given by 6 msec and antenna switching is employed by wireless device 22 when SRS transmissions occur. The traffic model for the downlink is selected as full buffer for all wireless devices 22.

Figure 9:
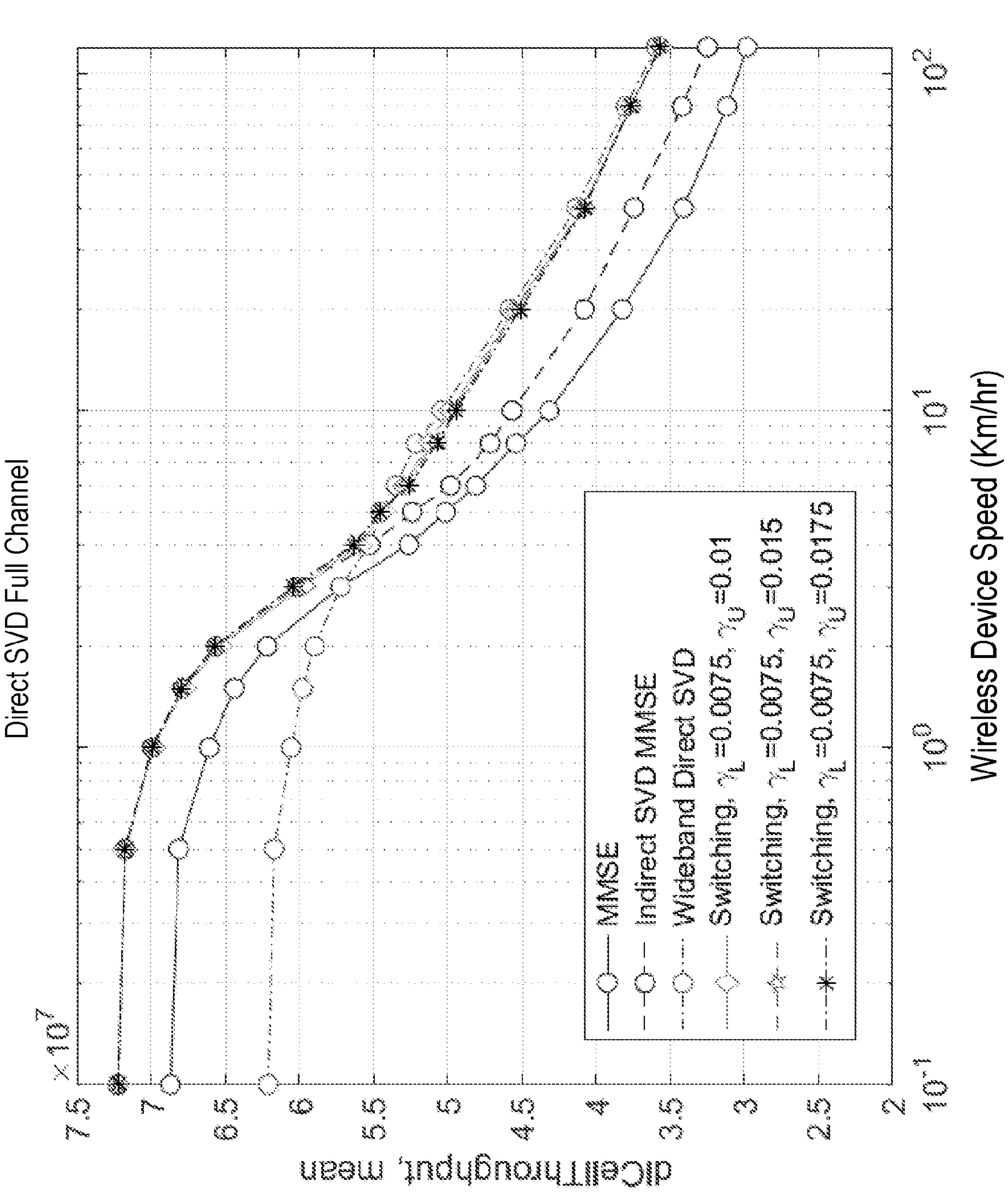
FIG. 9 is a diagram of average downlink cell throughput versus wireless device speed according to some embodiments of the present disclosure.

The wideband direct SVD and Indirect SVD algorithms employ averaging over the full bandwidth. Furthermore, the channel estimates are utilized after a delay 2 msec corresponding to 4 transmission slots. FIG. 9 is a diagram illustrating the average downlink cell throughput versus the speed of the wireless devices 22. From FIG. 9 it is illustrated that direct SVD precoding has superior performance at high mobility to the other precodings while Indirect SVD precoding yields superior performance at low mobility compared to the other precodings. Further, FIG. 9 illustrates that the switching algorithm described herein (i.e., precoding mode switching algorithm) can effectively select the precoding scheme and provide robustness against wireless device 22 mobility. Furthermore, FIG. 9 illustrates that the switching algorithm described herein is not sensitive to the selection of the switching thresholds where the switching algorithm is denoted by "Switching".

Figure 10:
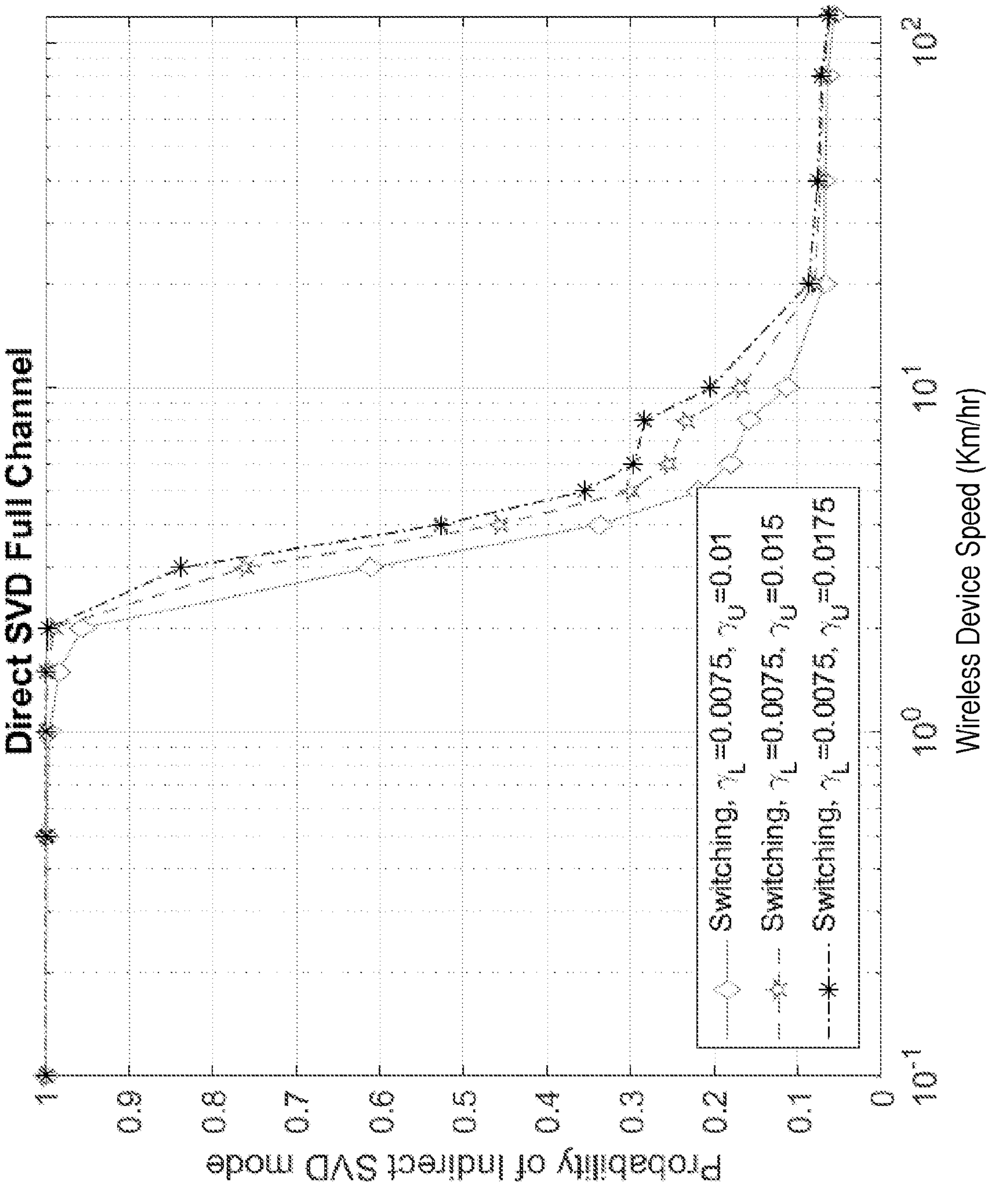
FIG. 10 is a diagram of probability of indirect SVD mode versus wireless device speed according to some embodiments of the present disclosure.

FIG. 10 is a diagram illustrating the probability of selecting the indirect SVD precoding versus the speed of wireless devices 22. At low mobility, frequency selective indirect SVD precoding scheme is selected with high probability.

However, as the speed of wireless device 22 increases, the probability of selecting wideband transmission mode increases.

Therefore, the algorithm described herein can effectively switch between wideband and frequency-selective precoding (e.g., narrow-band precoding) based on the estimated channel variation coefficient, thereby providing almost the maximum achievable downlink throughput of the two precoding schemes at different wireless device mobility. Further, the algorithm described herein is not sensitive to the selection of the switching thresholds.

Some Examples

Example 1. Method and system for switching between frequency selective and wideband precoding based on the mobility of the UE (i.e., wireless device 22).

Example 2. The Method and system in Example 1 where the mobility is estimated using a channel variation coefficient.

Example 3. The Method and system in any one of Examples 1 and 2 where frequency selective precoding is implemented using per subband SVD precoding, indirect SVD precoding or indirect polarized SVD MMSE precoding Example 4. The Method and System in any one of Examples 1 and 2 where wideband precoding is implemented using direct SVD precoding or direct polarized SVD precoding.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

MIMO Multiple Input Multiple Output
MMSE Minimum Mean Square Error
SVD Singular Value Decomposition
UE User Equipment It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:

processing circuitry configured to:

determine, based on at least one mobility estimate including a channel variation coefficient (CVC) estimate based at least on a plurality of uplink reference signals, a precoder by selecting one of (i) a wideband precoder based on wideband channel state information and (ii) a narrow-band precoder based on frequency-dependent channel state information, wherein the wideband precoder is selected based at least on the CVC estimate being above a threshold, the narrow-band precoder is selected based at least on the CVC estimate being less than the threshold, and a previously implemented precoder is selected based at least on the CVC estimate being equal to the threshold; and cause transmission to a wireless device using the determined precoder.

2. The network node of claim 1, wherein the wideband precoder is a wideband direct single value decomposition (SVD) precoder.

3. The network node of claim 1, wherein the wideband precoder is a wideband direct polarized single value decomposition (SVD) precoder.

4. The network node of claim 1, wherein the wideband precoder is applied to a bandwidth corresponding to a group of subbands.

5. The network node of claim 1, wherein the narrow-band precoder is selected based at least on the CVC estimate being less than a threshold.

6. The network node of claim 5, wherein the narrow-band precoder is an indirect single value decomposition (SVD) minimum mean square error (MMSE) precoder.

7. The network node of claim 5, wherein the narrow-band precoder is an indirect polarized single value decomposition (SVD) minimum mean square error (MMSE) precoder.

8. The network node of claim 5, wherein the narrow-band precoder is applied to a bandwidth corresponding to a single subband.

9. The network node of claim 1, wherein the precoder is a previously implemented precoder that is selected based at least on the CVC estimate being equal to a threshold.

10. A method implemented by a network node, the method comprising:

determining, based on at least one mobility estimate including a channel variation coefficient (CVC) estimate based at least on a plurality of uplink reference signals, a precoder by selecting one of (i) a wideband precoder based on wideband channel state information and (ii) a narrow-band precoder based on frequency-dependent channel state information, wherein the wideband precoder is selected based at least on the CVC estimate being above a threshold, the narrow-band precoder is selected based at least on the CVC estimate being less than the threshold, and a previously implemented precoder is selected based at least on the CVC estimate being equal to the threshold; and causing transmission to a wireless device using the determined precoder.

11. The method of claim 10, wherein the wideband precoder is a wideband direct single value decomposition (SVD) precoder.

12. The method of claim 10, wherein the wideband precoder is a wideband direct polarized single value decomposition (SVD) precoder.

13. The method of claim 10, wherein the wideband precoder is applied to a bandwidth corresponding to a group of subbands.

14. A non-transitory computer readable medium comprising processing instructions that when executed by a processor, cause the processor to:

determine, based on at least one mobility estimate including a channel variation coefficient (CVC) estimate based at least on a plurality of uplink reference signals, a precoder by selecting one of (i) a wideband precoder based on wideband channel state information and ii) a narrow-band precoder based on frequency-dependent channel state information, wherein the wideband precoder is selected based at least on the CVC estimate being above a threshold, the narrow-band precoder is selected based at least on the CVC estimate being less than the threshold, and a previously implemented precoder is selected based at least on the CVC estimate being equal to the threshold; and cause transmission to a wireless device using the determined precoder.

* * * * *